United States Patent [19]
Gebelin et al.

[11] Patent Number: 5,377,238
[45] Date of Patent: Dec. 27, 1994

[54] DEVICE FOR THE UNDERWATER MACHINING OF A SPACER-GRID OF A FUEL ASSEMBLY FOR A NUCLEAR REACTOR

[75] Inventors: Bernard Gebelin, Tassin la Demi-Lune; Michel Bline, L'Arbresle, both of France

[73] Assignees: Framatome, Courbevoie; Cogema, Velizy-Villacoublay, both of France

[21] Appl. No.: 96,813

[22] Filed: Jul. 27, 1993

[30] Foreign Application Priority Data

Jul. 27, 1992 [FR] France .................................. 9209247

[51] Int. Cl.⁵ .............................................. G21C 19/00
[52] U.S. Cl. ................................... 376/260; 29/402.06; 451/439
[58] Field of Search ................ 376/260, 261; 51/72 L, 51/241 R, 241 S; 29/402.06, 426.4, 723, 906

[56] References Cited

U.S. PATENT DOCUMENTS

| | | | |
|---|---|---|---|
| 4,383,394 | 5/1983 | Qurnell et al. | 376/261 |
| 4,724,636 | 2/1988 | Tolino | 376/260 |
| 5,097,583 | 3/1992 | Kramer et al. | 376/260 |

FOREIGN PATENT DOCUMENTS 192406 8/1986 European Pat. Off. .
445670 9/1991 European Pat. Off. .

OTHER PUBLICATIONS

RGN Revue Generale Nucleaire, No. 1, Jan. 1992, Paris, FR, pp. 21-25.

*Primary Examiner*—Daniel D. Wasil
*Attorney, Agent, or Firm*—Pollock, Vande Sande & Priddy

[57] ABSTRACT

The device comprises a platform (13) fixed in a horizontal position on a support structure (3) for the fuel assembly (4) placed under water in a pool (1). The platform (13) includes a table (14) for shifting a carriage (35) in two crossed directions in a horizontal plane and an arrangement (27) for clamping the fuel assembly so as to immobilize it in the machining position. The fuel assembly (4) is placed in the machining position by a hoisting device (6). A table (15) mounted on the table (14) for movement in one of said crossed directions in the horizontal plane is returned elastically (40) in the direction toward the assembly (4). A frame (16) is fixed on the table (15) and permits shifting a tool-carrying carriage (49) in a direction defined by the frame (16). A motorized grinding unit (17) is fixed on the tool-carrying carriage. The device may be used in particular for cutting or levelling the surface of a spacer-grid (8) of a used fuel assembly (4).

13 Claims, 7 Drawing Sheets

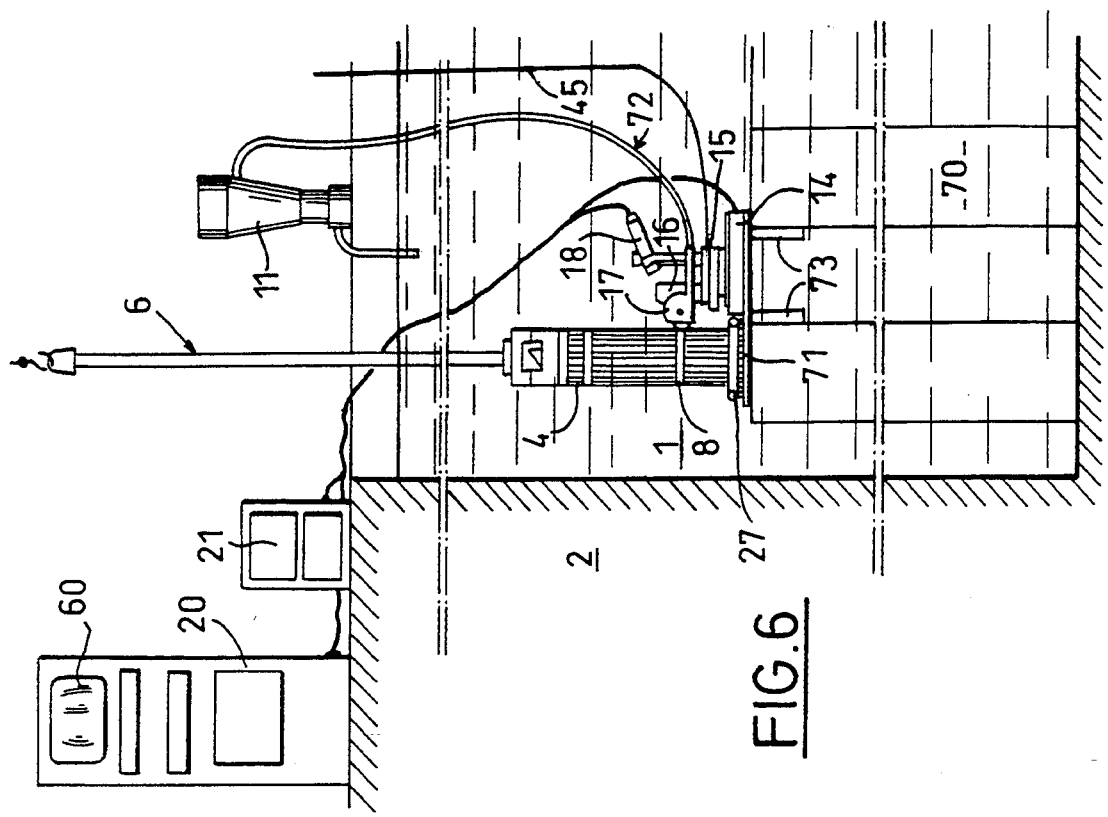
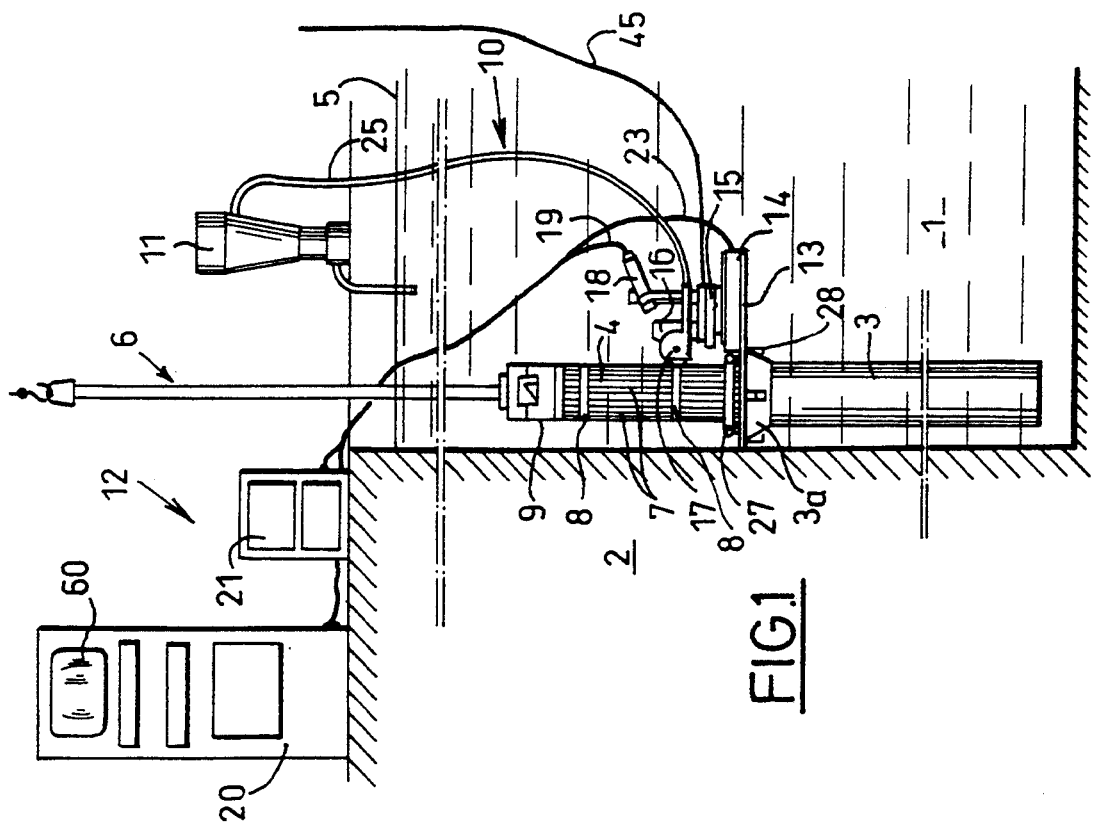

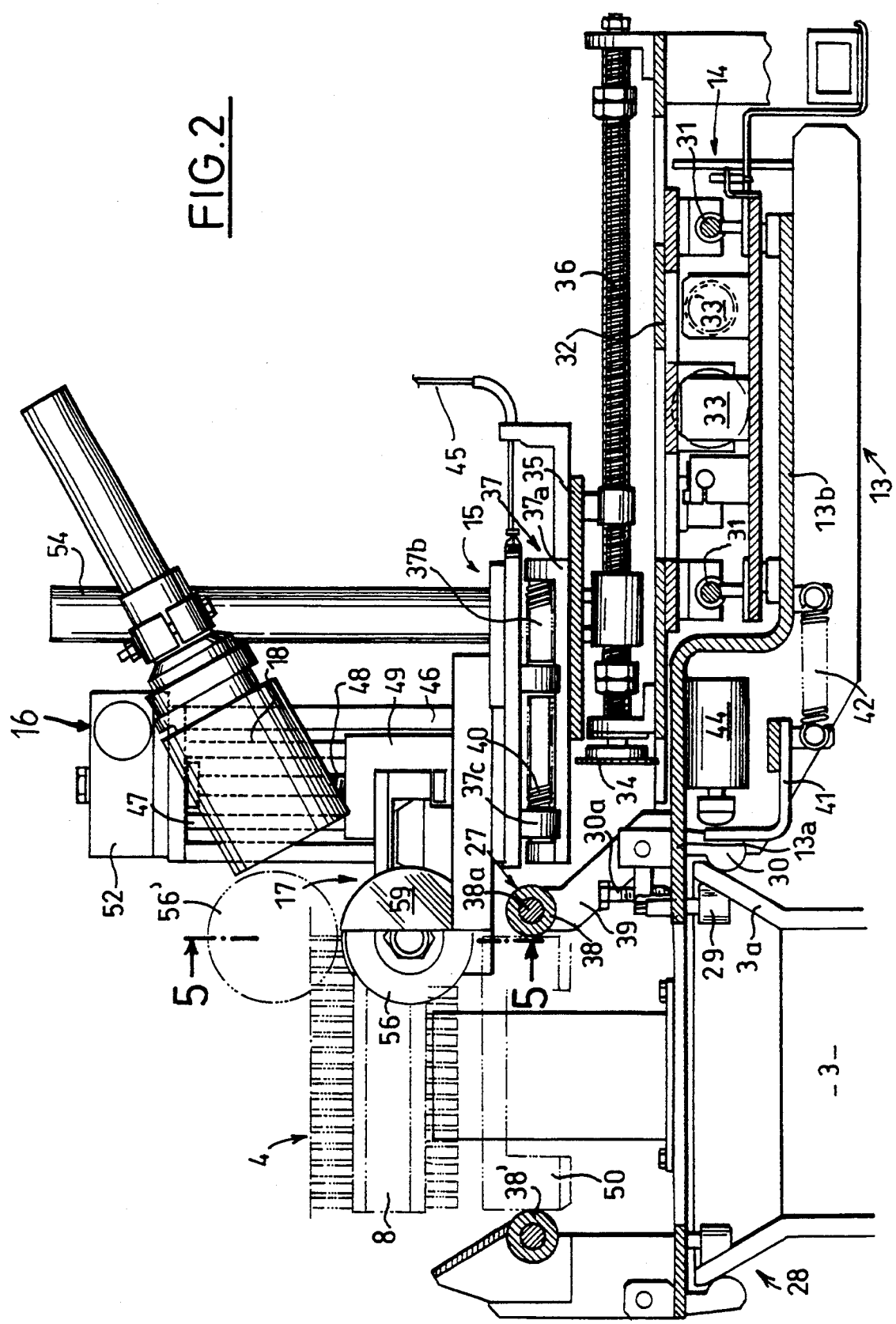

DEVICE FOR THE UNDERWATER MACHINING OF A SPACER-GRID OF A FUEL ASSEMBLY FOR A NUCLEAR REACTOR

FIELD OF THE INVENTION

The invention relates to a device for the underwater machining of a spacer-grid of a fuel assembly for a nuclear reactor and in particular a fuel assembly for a nuclear reactor cooled with pressurized water.

BACKGROUND OF THE INVENTION

Fuel assemblies of nuclear reactors cooled with pressurized water, and more generally fuel assemblies of nuclear reactors cooled with light water, usually comprise a cluster of parallel fuel rods maintained in a structure comprising spacer-grids for transversely maintaining the rods and arranged in the longitudinal direction of the cluster.

These fuel assemblies have a prismatic shape, for example with a square section and planar lateral sides. The spacer-grids are constituted by metal plates assembled at right angles so as to constitute a network of square meshes for receiving the fuel rods.

In addition to the transverse maintenance of the rods, the grids perform other functions such as the guiding of the cooling fluid circulating in contact with the fuel rods of the assembly. The plates constituting the grids are consequently cut out and bent so as to constitute guide fins for the cooling fluid.

The spacer-grid of square shape has planar outer sides constituted by plates assembled at right angles.

The structure of the assembly further comprises guide tubes fixed to each of the spacer-grids and connected at their ends to an upper nozzle and a lower nozzle of the assembly. These nozzles also include planar lateral sides which are disposed, in the same way as the outer lateral sides of the spacer-grids, in planes defining the planar lateral side of the assembly of prismatic shape.

In the course of the maintenance operations required for periodically unloading and reloading the core of the reactor, some spacer-grids may be damaged so that it is no longer possible to reload the fuel assembly in a place of the core of the reactor without carrying out certain repairs.

This is true in particular when the parts of the grid, such as the guide fins, have been bent outwardly and project from the outer planar side of the fuel assembly. It is then necessary to machine the spacer-grid, for example by grinding, so as to eliminate the projecting parts that prevent its loading inside the core of the reactor.

In the case where a spacer-grid has a damaged part in the vicinity of one of its outer sides, for example that located on a corner of the spacer-grid, it may be possible to eliminate this damaged part and to place a mini-grid for maintaining the rods in the place of the damaged grid part. The damaged grid part may be removed by cutting or grinding in the manner described in FR-A-90-16496 filed by FRAMATOME and COGEMA.

The cutting and grinding operations on the spacer-grids of irradiated fuel assemblies must be carried out under water within a pool. As it might be necessary to machine a grid at any level in the height of the assembly, tools must be provided which are capable of being fixed at any level along the structure of the assembly.

Such tools are complex and difficult to use when the assembly is taken up by handling means, such as a lowering device, or is located in a storage bay at the bottom of the pool.

SUMMARY OF THE INVENTION

An object of the invention is to provide an underwater machining device for a spacer-grid of a fuel assembly for a nuclear reactor comprising a cluster of parallel fuel rods and spacer-grids for transversely maintaining the rods of the cluster and having a prismatic shape and planar lateral sides, this device of simple structure and operation effecting a cutting or grinding of any spacer-grid of a fuel assembly inside a pool.

For this purpose, the device comprises:

a platform including means for fixing it in a horizontal position on a support structure for the fuel assembly placed under water in a pool, means for shifting a carriage in two crossed directions in the horizontal plane and carried by the platform, means for hoisting the assembly in a vertical position relative to the support structure, means for clamping the assembly on at least two opposite lateral sides carried by the platform, so as to immobilize the assembly, connected to the hoisting means, in a spacer-grid machining position, a table mounted to be movable on the carriage in one direction in the horizontal plane and returned in a direction toward the assembly by elastic return means, a tool support fixed on the table and carrying a tool-holder carriage mounted to be movable in a direction defined by the tool support, a motorized grinding unit fixed to the tool-holder carriage, and means for shifting the tool-holder carriage on the tool support in said direction defined by said tool support.

BRIEF DESCRIPTION OF THE DRAWINGS

In order to explain the invention there will now be described, by way of example and with reference to the accompanying drawings, two embodiments of a device according to the invention.

FIG. 1 is a schematic elevational view of a first embodiment of a machining device according to the invention.

FIG. 2 is a sectional view in a vertical plane of the machining unit of the device shown in FIG. 1, in a first configuration.

FIG. 6 is a schematic elevational view of a second embodiment of a device according to the invention.

DETAILED DESCRIPTION

Figure 2A:
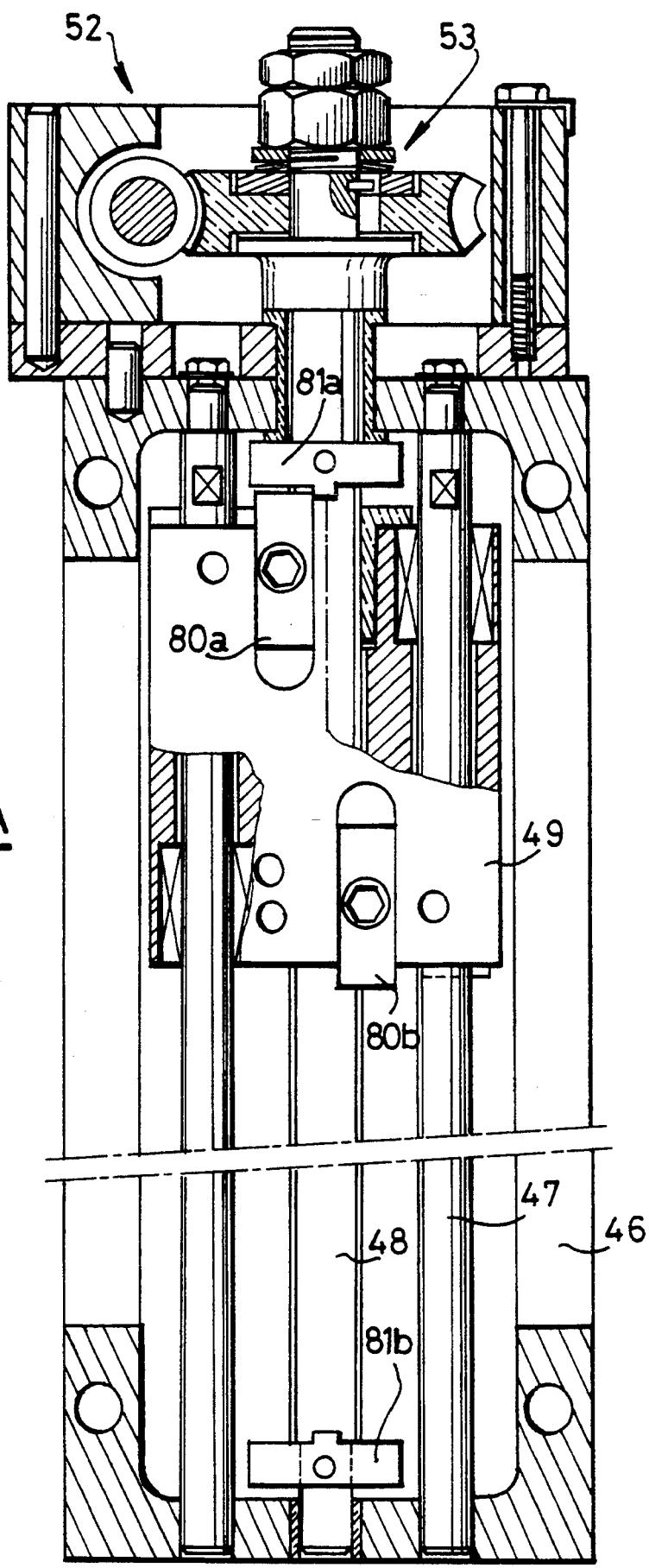
FIG. 2A is an elevational view, partly in section and to a larger scale, of a part of the structure shown in FIG. 2 corresponding to the tool support.

Shown in FIG. 1 is a part of the pool 1 for storing worn fuel assemblies of a nuclear reactor in the vicinity of one of its walls 2.

The pool is equipped with a lowering device (not shown) fixed along the wall 2 and permitting the displacement of containers 3, each of which may contain a fuel assembly 4.

By means of the lowering device, the fuel assemblies may be placed in an immersed position below the upper level 5 of the water in the pool so that their lower part is located in the vicinity of the bottom of the pool.

A hoisting device 6 only the lower part of which is shown comprising a hoisting boom and means for hooking the assembly permits shifting the assembly in the vertical direction and in particular taking the assembly out of the container 3 of the lowering device or introducing the assembly in this container.

The fuel assembly 4 comprises a cluster of rods 7 extending parallel to one another along the length of the assembly and rod-maintaining spacer-grids 8 spaced apart along the length of the cluster and constituting with end nozzles of the assembly, such as 9, and guide tubes connected to the spacer-grids 8, a framework ensuring the maintenance of the rods 7.

The machining device 10 according to the invention, generally designated by the reference character 10, comprises a machining unit proper which will be described hereinafter, the hoisting means 6 for the assembly, a suction unit 11 and means 12, placed on the edge of the pool above the wall 2, for controlling and monitoring the machining operation.

The machining unit proper comprises a horizontal platform 13 including means for fixing it in a horizontal position above the upper divergent part 3a of the container 3 of the lowering device, a table for shifting in two crossed directions in the horizontal plane or table X—Y 14, a safety table 15 fixed to the upper carriage of the table X—Y 14, a tool support 16 fixed to the safety table 15 and a grinding unit 17 detachably secured to a tool-holder carriage movable on the support 16.

The table 15 also carries, through the intermediary of a support, a video camera 18 connected by a cable 19 to an electronic unit 20 constituting a part of means for controlling and monitoring the machining and including a video screen 60.

The controlling and monitoring means 12 further comprise a unit 21 controlling the displacements X—Y of the table 14 through a cable 23.

The grinding unit 17 is also connected to the suction unit 11 through piping 25 so that machining particles in suspension in the water of the pool are entrained in the suction unit 11 which includes a filter for retaining the radioactive machining particles, the pool water being recycled.

As can be seen in FIG. 1, in order to carry out a machining operation, for example a cutting operation on a spacer-grid 8 of the assembly, the latter is lowered into the pool and into the container 3 on which the machining unit was previously fixed, at the level of the upper edge of the pool.

The fuel assembly 4 is then secured to the hoisting device 6 and lifted out of the container 3, as shown in FIG. 1, so that the spacer-grid 8 to be cut is located at the level of the grinding wheel of the grinding unit 17.

The precise positioning of the grinding unit is achieved by shifting the carriage X—Y and by shifting the grinding unit on the tool support 16.

The fuel assembly 4 is held in its machining position by clamping means 27 carried by the platform 13 and bearing against the planar lateral sides of the assembly 4, which has a prismatic square-sectioned shape.

The machining, for example the cutting of the grid, may be effected by driving the grinding wheel of the grinding unit 17 in rotation and shifting the grinding unit 17 on the tool support 16 in the vertical direction.

The machining unit schematically shown in FIG. 1 will now be described in more detail with reference to FIGS. 2 to 5.

Shown in FIG. 2 is the platform 13 which has a planar upper part 13a on which are fixed four clamping devices 28 adapted to engage with the upper part 3a of the container 3 of the lowering device for fixing the platform 13, and a lower part 13b parallel to the upper part 13a on which is fixed the table 14 for movement in two crossed directions.

The clamping devices 28 comprise an inner shoe 29 fixed to the end of a screw and having an inclined edge adapted to bear against the inner surface of the upper part 3a of the container of the lowering device 3 and a pivotal shoe 30 having a cylindrical surface adapted to bear against the outer surface of the upper part 3a of the lowering device. The shoe 30, which is mounted on a horizontal pivot pin, may be shifted in the clamping direction or unclamping direction by a screw 30a engaged in a tapped hole in a lever arm connected to the shoe 30.

The platform 13 and the machining unit may be fixed on the container 3 of the lowering device by means of the clamping devices 28 at the upper level of the pool.

The table 14 for movement in crossed directions comprises a first group of slideways 31 disposed in a first direction of the horizontal plane, perpendicular to the plane of FIG. 2 and designated as direction X.

A plate 32 is mounted to be movable in the direction X along the slideways 31.

The plate 32 is connected to a nut in which is engaged a lead screw drivable in rotation in either direction. To this end, the screw carries a pulley 33 which is driven in rotation by a motor 33' through the medium of a chain.

The plate 32 carries a guiding and driving assembly for a second horizontal direction Y perpendicular to the direction X, a carriage 35 constituting the carriage movable in crossed directions of the table X—Y.

The carriage 35 is driven in translation in the direction Y by a lead-screw 36 engaged with a nut connected to the carriage 35.

The lead-screw 36, which is rotatably mounted on the plate 32 inside ball bearings carries a sprocket wheel which is driven in rotation by a motor through the medium of a chain.

Further, the carriage 35 is guided by ball bushings engaged on guide rods parallel to the direction Y.

The carriage 35 movable in crossed directions X and Y carries the safety table 15 on which is mounted the tool support through the medium of a holding unit 37, the force of which is controlled.

This holding unit comprises a support 37a fixed to the carriage 35 on which are mounted two guide rods 37b parallel to the direction Y and on which are engaged sliding bearings 37c connected to the safety plate 15.

Springs 40 ensure the return of the safety table 15 in the direction Y toward the assembly 4 on which the machining is carried out.

The springs 40 have a return force maintaining the safety plate and therefore the tool support in a position shifted toward the assembly so long as the reaction exerted by the assembly on the tool does not exceed a certain limit value.

In the case of a resistance higher than this limit value in the course of the machining of the grid of the assembly 4, the safety plate, the tool support and the tool are capable of withdrawing so as to disengage the tool.

Figure 4:
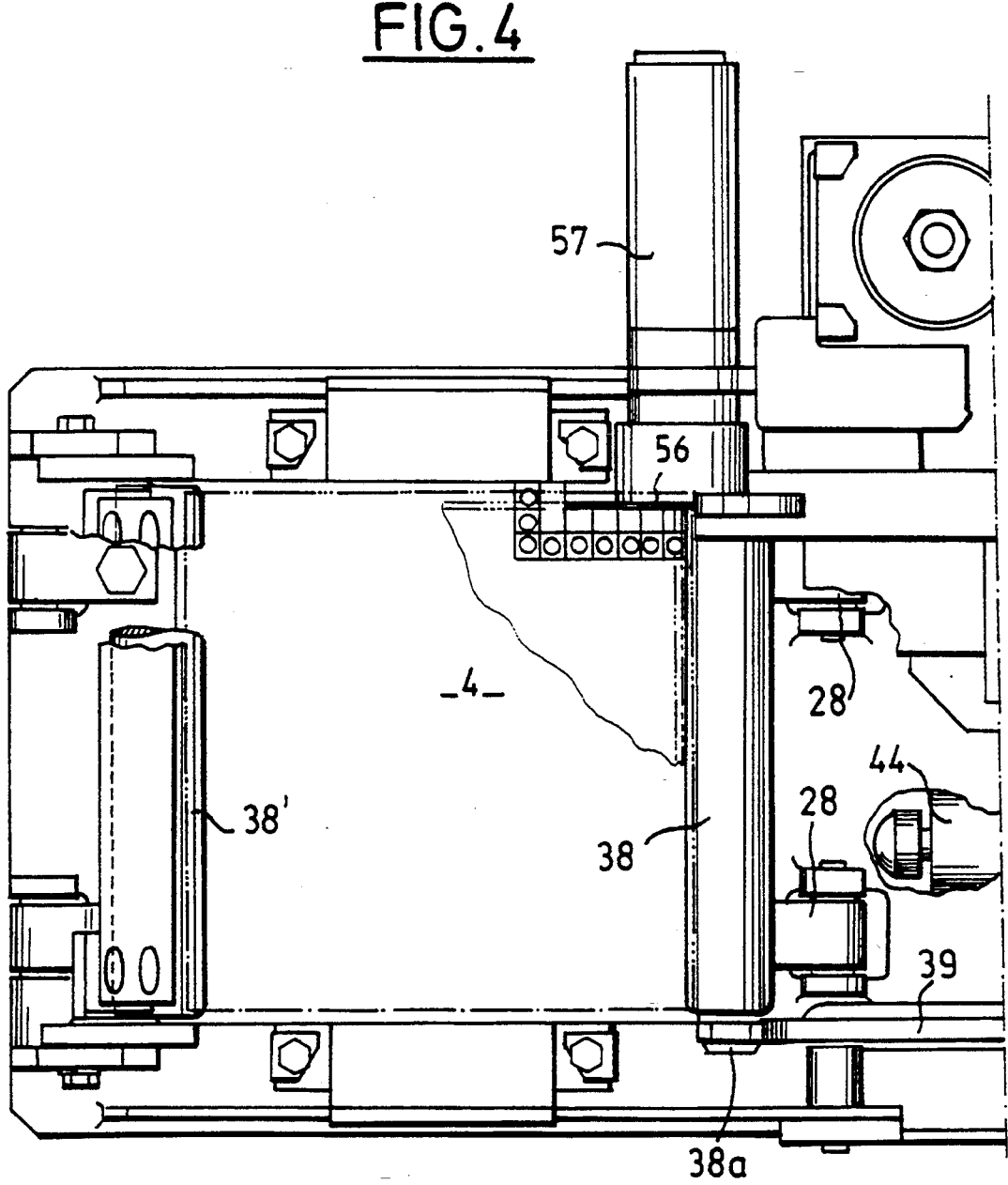
FIG. 4 is a partial top plan view of the device according to the invention during the machining of a spacer-grid of a fuel assembly.

As can be seen in FIGS. 2 and 4, the clamping device 27 of the fuel assembly, whereby it may be held in the machining position, comprises a roller 38 mounted on a horizontal spindle 38a connected to the ends of two arms 39 pivotally mounted on the upper part 13a of the platform 13 by means of a horizontal shaft located in alignment with the articulation axis of the clamping devices 28.

Each of the arms 39 is connected to an elastic return system comprising a bracket 41 and a return spring 42 fixed to the bracket 41 and to the lower part 13b of the platform 13.

The arms 39 of the clamping device 27 for the assembly are also associated with pneumatic jacks or cylinder devices 44, whereby it is possible to tilt the arms 39 and shift the roller 38 away from the assembly so as to release the latter.

The return springs 42 bias the roller 38 toward the assembly in the course of the machining.

By releasing the pneumatic jacks 44, the roller 38 is consequently made to bear with pressure against a lateral side of the assembly.

A second roller 38' parallel to the roller 38 is mounted on a fixed unit carried by the platform 13. The distance between the rollers 38 and 38', when the roller 38 is shifted away from the assembly by the jacks 44, permits the passage of the assembly.

By releasing the jacks 44, the roller 38 is made to bear against a planar lateral side of the assembly which comes to bear against the fixed roller 38' by its opposite side.

The safety table 15 on which the tool support 16 is fixed is connected to one of the ends of a traction cable 45 whose other end located above the edge of the pool enables an operator to pull on the safety table and cause the tool support and the grinding unit 17 to withdraw by exerting a force opposing the action of the springs 40, in the event of the device for automatically advancing or withdrawing in the direction Y (screw-nut system 36) breaking down or an accidental jamming of the grinding tool.

The grinding wheel of the grinding unit can in this way always be disengaged from the assembly 4 in the course of machining.

FIG. 2 shows the machining unit comprising the tool support 16 and the grinding unit 17, in a position for grinding a spacer-grid 8 of a fuel assembly 4 in the vertical position, for example for cutting a part of the grid.

As can be seen in FIGS. 2 and 2A, the tool support 16 fixed to the safety table 15 includes a frame 46 having vertical posts and in which are fixed vertical guide columns 47 and a driving lead-screw 48 which is also vertical and engaged in a nut connected to the carriage 49 for shifting the grinding unit 17 in the vertical direction and to an extent for grinding or cutting the spacer-grid 8.

The lead-screw 48 can be driven in rotation by a motor-speed reducer unit 52 fixed on the upper part of the frame 46 and comprising a torque limiter 53 for interrupting the transmission of the force shifting the carriage 49 in the event of a jamming in the course of machining.

The frame 46 is mounted on a fixing plate mounted on the safety table 15 and constitutes a shifting and vertical guiding unit in which are fixed the columns 47 and the lead-screw 58. A vertical column 54 fixed to the table 15 carries a camera 18 for monitoring the tool setting and machining operations.

Stops 80a and 80b fixed to the carriage 49 are adapted to cooperate with fixed end-of-travel stops 81a and 81b for stopping the carriage 49 in the upward direction and downward direction.

The vertical part for guiding and shifting the frame 46 is mounted on the safety table 15.

Mounted on the carriage 49 is a support 100 (shown in FIG. 5A) on which a grinding wheel carrier 101 is mounted to pivot about a pin 102, the carrier being held in position by a system 103 comprising a screw, a spring engaged on the screw and a ball which comes to engage in a cavity in the support. The spring is made to bear against the ball by the action of the screw so that the grinding wheel carrier 101 is held in position on the support 100.

In the event, as the grinding wheel approaches a grid before cutting the latter, that the grinding wheel comes in contact with an obstacle, the reaction of the obstacle on the grinding wheel carrier causes the grinding wheel carrier 101 to pivot relative to the support 100, whereupon the ball leaves the cavity; this avoids damaging the grinding wheel and/or the grid.

The fuel assembly 4 is suspended by means of the hoist 6 and the assembly 4 is clamped and immobilized in the machining position by causing the rollers 38 and 38' to bear against the planar outer sides of a lower nozzle 50 of the assembly 4.

The frame 46 of the tool support 16 is fixed to the safety table so that the guide columns 47 and the shifting lead-screw 48 are in the vertical position.

Figure 5:
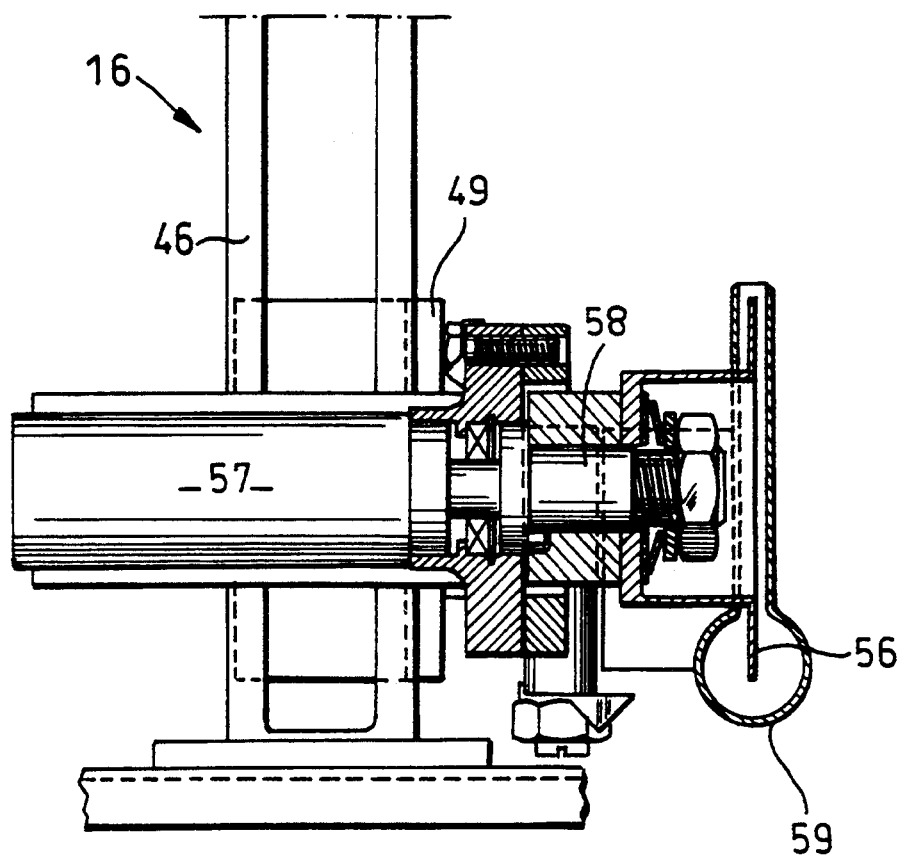
FIG. 5 is a sectional view taken on line 5—5 of FIG. 2 showing the machining unit.
Figure 5A:
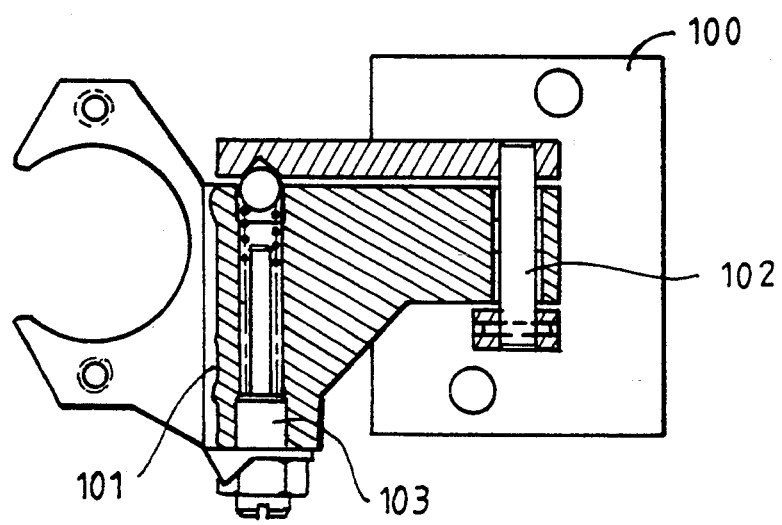
FIG. 5A is a sectional view of the support of the machining unit.

As can be seen in FIGS. 2 and 5, the grinding unit comprises a grinding wheel 56 whose active part has the shape of a disc and is connected by a bell-shaped part to the shaft 58 of a driving motor 57 by means of a nut, a thrust washer and an elastically yieldable washer.

The motor 57 is itself fixed to the carriage 49 which is movable in the vertical direction in the frame 46.

The disc-shaped active part of the grinding wheel 56 is surrounded by a housing 59 to which the suction pipe 25 is connected.

The active part of the grinding wheel in the shape of a disc is covered with an abrasive material formed by particles of diamond in a nickel matrix.

Several types of grinding wheel may be used, depending on the machining operation required on the spacer-grid of the assembly.

In order to cut off a part of the grid, a grinding wheel is used whose disc-shaped part is thin, for example with a thickness on the order of 1.5 mm.

In order to level or render flush the surface of the grid by grinding, a thick grinding wheel with a thickness of around 30 mm may be used. As in the case of the cutting grinding wheel, the active part of the grinding wheel is covered with an abrasive material formed by diamond particles in a nickel matrix.

In order to carry out a grinding operation in the vertical direction or to cut the spacer-grid 8, as shown in FIG. 2, the grinding wheel 56 of the grinding unit 17 is first of all placed in an upper position 56' which corresponds to the upper position of the carriage 49 inside the vertical part of the frame 46.

The initial position of the grinding wheel 56 relative to the grid 8 is moreover adjusted in the horizontal directions X and Y by use of the table which is shiftable in two crossed or perpendicular directions.

The location of the initial position of the grinding wheel 56 is achieved by use of the video camera 18 which provides an image displayed on the video screen 60 of the monitoring unit 20.

In the case of a cutting of a damaged part of the grid, the grinding wheel is shifted in the direction X relative to a reference in the sound or undamaged part of the spacer-grid.

To carry out machining operations, for example cutting in several directions of the grid, the fuel assembly may be rotated so as to present in succession several sides in front of the grinding wheel 56 for machining.

The machining is carried out by shifting the carriage 49 and the grinding unit 17 vertically downwardly.

Figure 3:
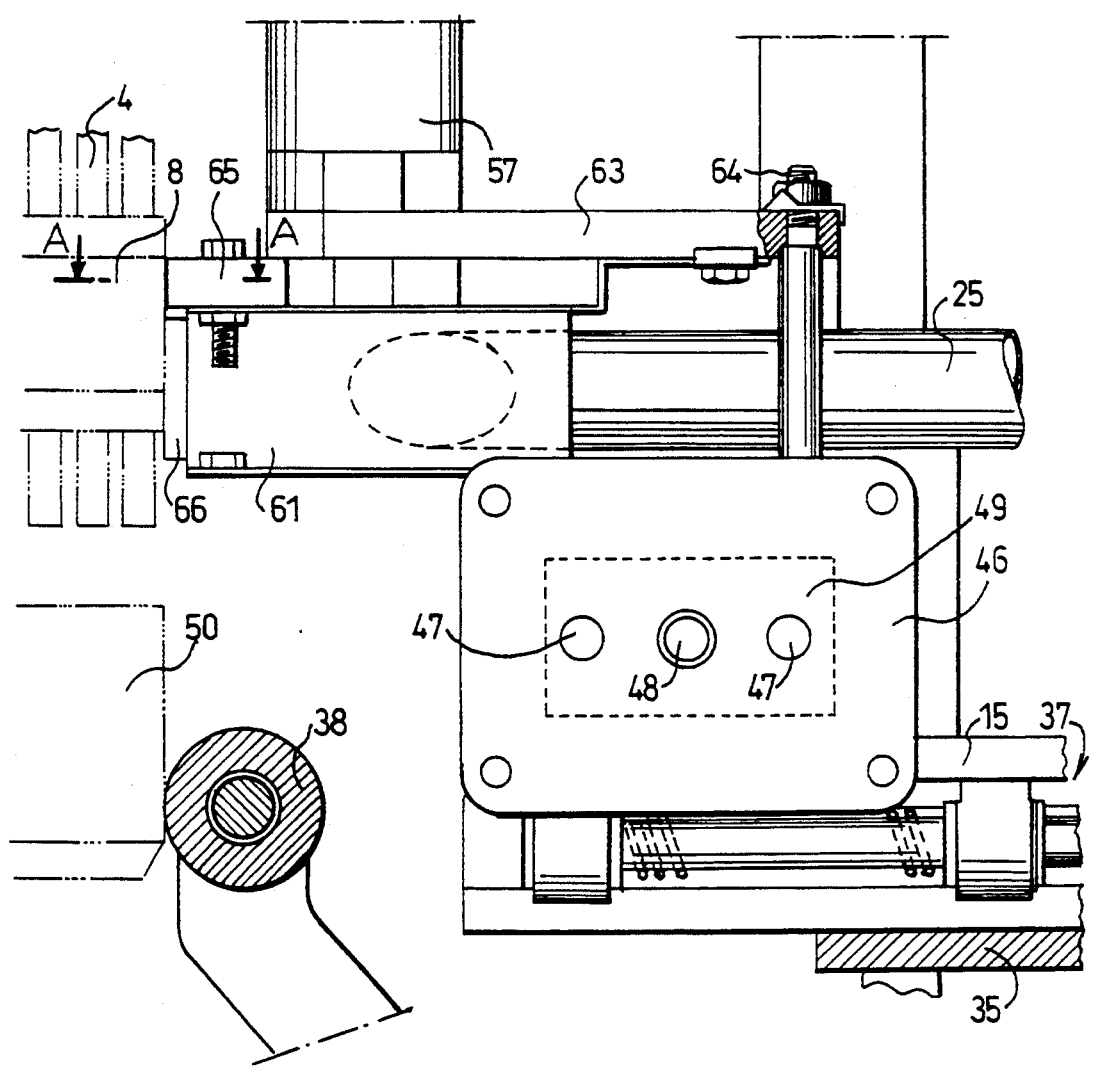
FIG. 3 is an elevational and sectional view of the tool support and the tool in a second configuration.

FIG. 3 shows a grinding unit 17 in an arrangement for grinding the lower spacer-grid 8 of the fuel assembly 4 on one of its outer planar sides and in the horizontal direction.

The frame of the tool support 46 is fixed in the horizontal position on the safety table 15 so that the columns 47 and the driving lead-screw 48 are capable of shifting the carriage 49 in a horizontal direction parallel to the side of the spacer-grid on which the grinding operation is to be effected.

As in the case of machining in the vertical direction, the assembly 4 is held by the rollers 38 and 38' which bear against two opposite planar sides of the lower nozzle 50 of the assembly 4.

A thick grinding wheel 66 having, for example a thickness on the order of 30 mm and being adapted to effect a levelling of the surface of the outer sides of the spacer-grid 8 is fixed on the driving shaft of the motor 57 inside the housing 61. The motor 57 has a support 63 which is fixed by screw-and-nut assemblies 64 on the carriage 49.

The suction pipe 25 is connected to the housing 61 in which the grinding wheel 66 is located.

Also fixed to the housing 61 is a shoe 65 for setting the exact machining depth by bearing against the side of the spacer-grid 8 being machined at the end of the feed of the grinding wheel.

The shoe 65 may be fixed to the upper part or to the lower part of the housing 61 by a screw-and-nut assembly.

Figure 3A:
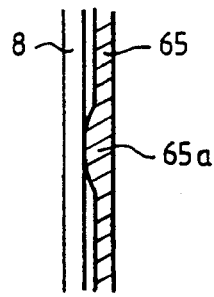
FIG. 3A is a partial sectional view taken on line A—A of FIG. 3.

As can be seen in FIG. 3A, the shoe 65 extends along the length of the grid 8 and has a central portion 65a having a cylindrical outer surface providing a satisfactory bearing effect, even in the case where the grid 8 and the shoe 65 are not perfectly parallel. The extent of the displacement of the grinding wheel in either direction along the length of the columns 47 permits effecting a levelling of the spacer-grid surface in one pass or several successive passes.

Shown in FIG. 6 is a machining device which is substantially identical to the device described hereinbefore and which may be employed for machining a fuel assembly 4 placed in a storage bay or compartment of a rack 70 resting on the bottom of the pool 1 for storing fuel assemblies.

Corresponding elements in FIGS. 1 and 6 carry the same reference characters.

The machining device 72 shown in FIG. 6 comprises the same elements as the device 10 shown in FIG. 1.

However, the platform 13 described hereinbefore is replaced by a platform 71 which is entirely planar and rests on the upper part of the storage bays of the rack 70.

The platform 71 includes vertically downwardly extending pins which are engaged in a storage bay next to the bay in which is disposed the fuel assembly 4 on which the machining operation is to be carried out.

The device shown in FIG. 6 is used in substantially the same way as the device shown in FIG. 1, the fuel assembly being hoisted by the hoisting device 6 so that the spacer-grid 8 is located in the vicinity of the grinding unit 17.

The grinding unit is placed in a vertical position or a horizontal position in a precise manner by using the table X—Y 14 as before, before starting the machining operation. The fuel assembly is immobilized by clamping devices employing shoes 27 carried by the platform 71.

Before use, the machining device according to the invention is checked and adjusted on the work floor at the upper level of the pool.

When the device is used for machining a fuel assembly placed inside the container of a lowering device, the platform carrying the whole of the machining device proper is fixed to the upper part of the container of the lowering device at the upper level of the pool before carrying out all of the checking and adjusting operations.

The assembly is then lowered to the bottom of the pool inside the container of the lowering device, then raised and immobilized in the machining position.

When the device is used for machining an assembly disposed inside a storage bay, the device is placed on the upper surface of the storage bays by means of an electric handling tackle. The checking and adjusting operations are carried out and the assembly is placed and immobilized in the machining position.

The device according to the invention always permits more precise machining of a spacer-grid of a fuel assembly whatever the position of this spacer-grid.

Devices may be employed which comprise a platform including means for fixing it in a horizontal position on a support structure for a fuel assembly which is different from a container of a lowering device or a storage rack.

The means for raising the assembly may be constituted by a handling tool of conventional type employed for shifting the assemblies in the storage pool. A special raising means may also be employed which provides a precise positioning of the assembly in the vertical direction.

The means for clamping and immobilizing the assembly may be of any type and clamping shoes different from those described may be used.

These means may be actuated by components different from the elastically yieldable return springs and pneumatic jacks.

The safety table on which the tool support rests may be mounted on the carriage with a certain degree of movement under a given force by means different from those described.

The tool support and the grinding unit may be arranged in a manner different from that described and include shifting and guiding means of any type.

The machining device according to the invention may De used for interventions which are different from the cutting of a part of a spacer-grid or the levelling by grinding of a side of a spacer-grid.

What is claimed is:

1. Device for the underwater machining of a spacer-grid of a fuel assembly for a nuclear reactor comprising a cluster of parallel fuel rods and spacer-grids which transversely maintain in position the rods of the cluster and have a prismatic shape and planar lateral sides, said device comprising in combination:

a pool containing water, a support structure for said fuel assembly placed under water in said pool, a platform including means for fixing said platform in a horizontal position on said support structure, a carriage carried by said platform, means for shifting said carriage in two crossed directions in a horizontal plane, means for hoisting said fuel assembly in a vertical position relative to said support structure, means for clamping said fuel assembly on at least two opposite lateral sides thereof and carried by said platform so as to immobilize the fuel assembly connected to said hoisting means, in a position for machining one of said spacer-grids, a table mounted on said carriage to be movable in a direction in a horizontal plane and elastic return means combined with said table for returning said table in a direction toward said fuel assembly, a tool support fixed to said table and a tool-holder carriage mounted on said tool support to be movable in a direction defined by said tool support, a motorized grinding unit fixed to said tool-holder carriage, and means for shifting said tool-holder carriage on said tool support in said direction defined by said tool support.

2. Device according to claim 1, wherein said means for fixing said platform on said support structure comprise two clamping shoes carried by said platform, at least one of said shoes being mounted to be pivotable about a horizontal axis on said platform and including clamping means constituted by a lever arm and a clamping screw bearing against said platform, said platform being fixed by clamping a wall of said support structure between said shoes.

3. Device according to claim 2, wherein said support structure is a container of a lowering device of the pool adapted to transport said fuel assembly in a vertical position inside said pool.

4. Device according to claim 1, wherein said platform comprises vertical downwardly extending positioning pins and said support structure is a storage rack at the bottom of said pool comprising compartments on the upper end of which said platform rests in an operating position, said pins being inserted in at least one of said compartments for maintaining said platform in position.

5. Device according to claim 1, wherein said clamping means for said fuel assembly comprise two arms pivotally mounted on said platform and a first roller connected with its axis in a horizontal position to ends of said two arms, means for shifting said arms and said first roller in a direction toward said fuel assembly, and means for shifting said two arms and said first roller in a direction away from said fuel assembly, and a second roller parallel to said first roller disposed in confronting relation to said first roller on said platform, so that said rollers are placed on each side of said fuel assembly connected to said hoisting means and in a raised position relative to said support structure.

6. Device according to claim 1, comprising horizontal slideways carried by said carriage, said table being movably mounted on said horizontal slideways, and at least one coil spring combined with said table for biasing said table in a direction toward said fuel assembly.

7. Device according to claim 1, comprising a traction cable connected at a first end to said table and having a second end at the upper level of said pool for retracting said table of said tool support and said grinding unit in the event of breakdown of said means for shifting said carriage in two crossed directions.

8. Device according to claim 1, wherein said tool support comprises a frame, guide columns for said tool-holder carriage fixed in said frame and defining said direction in which said tool-holder carriage is movable, and means for fixing said tool support on said table in a selected one of two positions in which said guide columns of said carriage extend in a vertical and in a horizontal direction respectively.

9. Device according to claim 1, wherein said grinding unit comprises a circular grinding wheel having an active part in the shape of a disc coated with abrasive material constituted by diamond particles coated with a layer of nickel.

10. Device according to claim 9, wherein said grinding wheel of said grinding unit is a cutting wheel having an active part whose thickness is substantially 1.5 mm.

11. Device according to claim 9, wherein said grinding wheel of said grinding unit is a levelling grinding wheel whose thickness is substantially 30 mm.

12. Device according to claim 11, wherein said grinding wheel is mounted within a housing on which is mounted a bearing shoe adapted to come into contact with one side of said spacer-grid in the course of the machining.

13. Device according to claim 12, wherein said bearing shoe extends along the length of said spacer-grid and has a median part having an outer surface of cylindrical shape adapted to bear against said spacer-grid.

* * * * *